United States Patent [19]
Gardner et al.

[11] Patent Number: 5,601,646
[45] Date of Patent: Feb. 11, 1997

[54] APPARATUS FOR APPLYING GEL TO A PLURALITY OF OPTICAL FIBERS

[75] Inventors: Scott J. Gardner; Scotty B. Hansley, both of Hickory, N.C.

[73] Assignee: Alcatel NA Cable Systems, Inc., Claremont, N.C.

[21] Appl. No.: 451,536

[22] Filed: May 26, 1995

[51] Int. Cl.$^6$ ........................................ B05C 3/00
[52] U.S. Cl. ............... 118/405; 118/420; 118/DIG. 18; 118/DIG. 19; 425/114
[58] Field of Search ........................ 118/405, 420, 118/DIG. 18, DIG. 19, DIG. 22; 427/163.2; 425/114; 264/1.28

[56] References Cited

U.S. PATENT DOCUMENTS

| | | | |
|---|---|---|---|
| 3,556,635 | 1/1971 | Schrenk et al. | 350/96 |
| 3,972,304 | 8/1976 | Boucher | 118/DIG. 19 |
| 4,098,926 | 7/1978 | Nöthe | 427/163 |
| 4,154,783 | 5/1979 | Jackson | 264/1 |
| 4,194,462 | 3/1980 | Knowles | 118/DIG. 18 |
| 4,246,299 | 1/1981 | Ohls | 427/54.1 |
| 4,258,646 | 3/1981 | Kloczewski et al. | 118/405 |
| 4,264,649 | 4/1981 | Claypoole et al. | 427/163 |
| 4,269,023 | 5/1981 | Garner | 118/DIG. 19 |
| 4,349,587 | 9/1982 | Aloisio, Jr. et al. | 427/163 |
| 4,409,154 | 10/1983 | Grenat | 264/1.5 |
| 4,474,638 | 10/1984 | Einsle | 156/494 |
| 4,623,495 | 11/1986 | Degoix et al. | 264/1.28 |
| 4,810,429 | 3/1989 | Mayr | 264/1.5 |
| 4,900,499 | 2/1990 | Mills | 425/114 |
| 4,939,002 | 7/1990 | Hilakos | 118/405 |
| 4,985,185 | 1/1991 | Mayr et al. | 264/1.5 |
| 5,069,850 | 12/1991 | Tompkins et al. | 425/114 |
| 5,395,557 | 3/1995 | Griser et al. | 264/1.28 |

FOREIGN PATENT DOCUMENTS

| | | |
|---|---|---|
| 0456970 | 2/1991 | European Pat. Off. . |
| 56-067239 | 6/1981 | Japan . |
| 62-153101 | 7/1987 | Japan . |
| 9315896 | 8/1993 | WIPO . |

*Primary Examiner*—Laura Edwards
*Attorney, Agent, or Firm*—Ware, Fressola, Van Der Sluys & Adolphson

[57] ABSTRACT

An apparatus for applying gel to a plurality of optical fibers includes a housing having a cavity through which a plurality of separated optical fibers are fed. The gel is provided to the cavity from a gel reservoir via a pump that maintains the pressure and gel level to ensure that the optical fibers are coated with gel to eliminate air gaps and thus prevent sticking among the optical fibers.

12 Claims, 5 Drawing Sheets

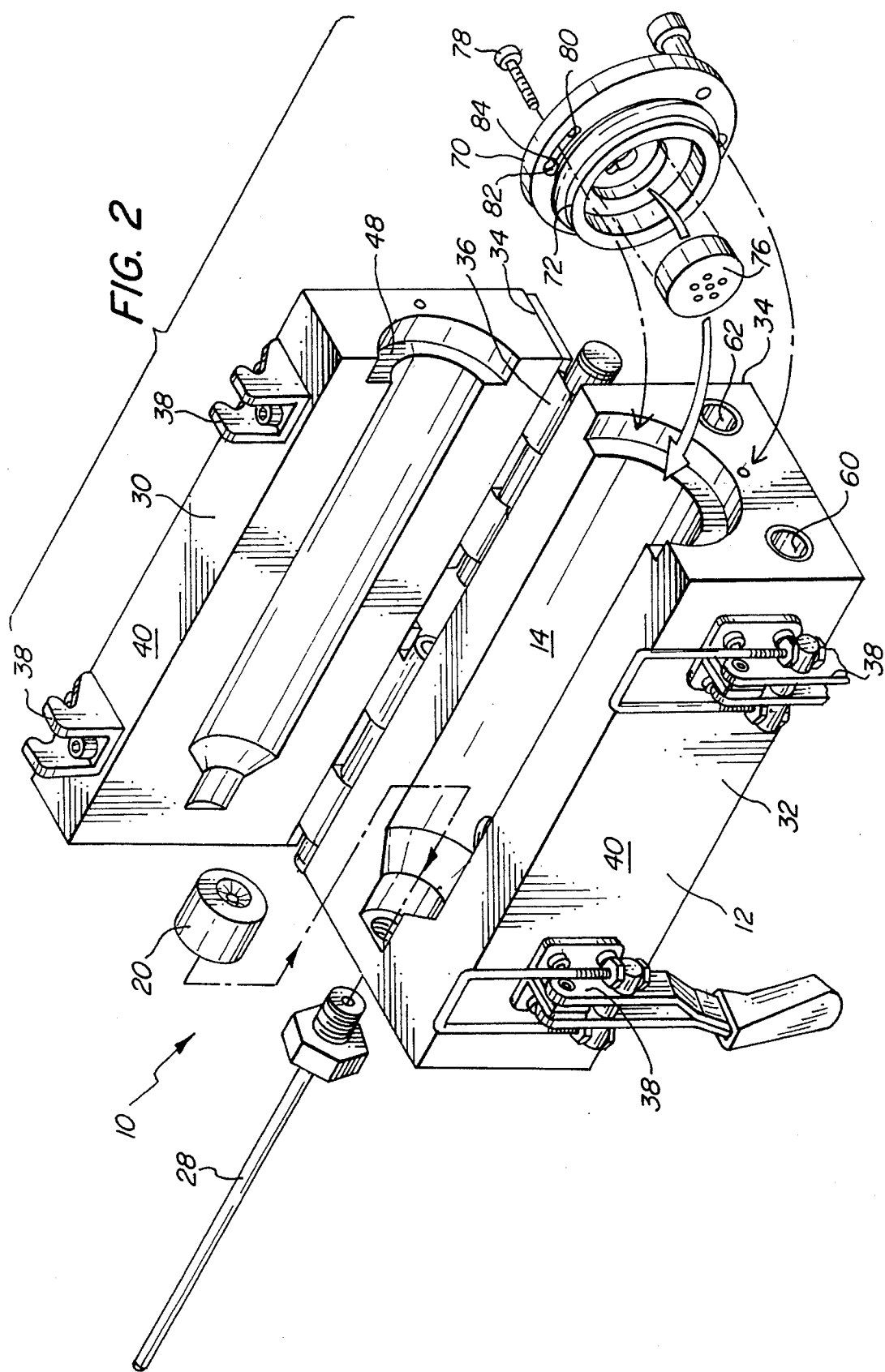

APPARATUS FOR APPLYING GEL TO A PLURALITY OF OPTICAL FIBERS

BACKGROUND OF THE INVENTION

1. Field of the Invention

The present invention generally relates to an apparatus for applying a gel to a plurality of optical fibers and, in particular, relates to one such apparatus having means for injecting a gel into a cavity having a plurality of separated optical fibers extending therethrough such that each of the optical fibers is coated with the gel.

2. Description of the Prior Art

In the manufacture of fiber optic cables, a plurality of optical fibers are first collected into fiber optic bundles. A number of these fiber optic bundles are then wound together to form the fiber optic cable. Typically, during the formation of the fiber optic bundles a plurality of optical fibers are passed through an extrusion cross head. As the fibers are passed through the extrusion cross head, heat is applied such that a plastic sheath is extruded around the fibers to contain the optical fibers as a bundle. One major difficulty encountered during this process is that the heat required for applying the sheath can soften the thermoplastic ink coating on the optical fibers causing the fibers to adhere, or stick, to each other. Such sticking can result in a catastrophic transmission loss of the optical fibers and thus lead to a failure of the resultant fiber optic cable.

It is generally accepted practice in the industry, therefore, to apply some form of filling compound to the optical fibers prior to passing the optical fibers through the extrusion cross head. Historically, the application of filling compounds has been largely unsuccessful.

Conventional techniques for applying a filling compound exhibit numerous drawbacks. For example, failure to maintain a sufficient level of filling compound in the application cavity or failure to maintain adequate pressure in the cavity can result in the formation of air gaps within the fiber optic bundle and thus allowing the fibers to adhere to each other. Further, when a higher pressure is applied or a high viscosity material is used, the drawing tension has increased to an unsafe level during the extrusion of the tube around the optical fibers. A further difficulty of conventional techniques is that the alignment of the output of the filling compound application unit with the extrusion cross head is crucial. If the filling compound application unit and the extrusion cross head are not precisely aligned, the optical fibers are dragged on the extrusion cross head entrance thus causing damage to the optical fibers.

Another conventional technique for avoiding the sticking of optical fibers during the formation of the bundles is the use of an oil applicator. Typically, such techniques lubricate the surfaces of the separated optical fibers with a low molecular weight oil. However, such oils often evolve off the fiber with the application of heat by the extrusion cross head. Hence, the oil dissipates before the optical fibers cool and the optical fibers stick to each other. Further, the chemical interaction between the selected oil and the thermoplastic ink coating on the optical fibers can be difficult to match to avoid sticking among the fibers. In addition, the quantity of oil entering the buffer tube is also difficult to control.

These difficulties have been substantially overcome as described in U.S. Pat. No. 5,395,557 entitled Method and Apparatus for Applying Gel to a Plurality of Optical Fibers which issued to Griser et at. on Mar. 7, 1995 and is assigned to the assignee hereof. The teachings of the above-identified U.S. Patent are hereby incorporated herein by reference. However, some of the above-recited difficulties remain problematical in that some air gaps have been found to form and thermal transfer into the apparatus can still be excessive.

Consequently, an apparatus for applying gel to a plurality of optical fibers that substantially completely overcomes the above-recited drawbacks is highly desirable and sorely needed in the optical fiber industry.

SUMMARY OF THE INVENTION

Accordingly, it is one object of the present invention to provide an apparatus for applying gel to a plurality of optical fibers that substantially completely overcomes the above-recited difficulties.

This object is accomplished, at least in part, by an apparatus having means for injecting a gel into a cavity having a plurality of separated optical fibers extending therethrough such that each of the optical fibers is coated with the gel and sticking of the optical fibers is prevented, while minimizing the stress placed on the optical fiber as it travels through the apparatus.

Other objects and advantages of the present invention will become apparent from the following detailed description of the invention read in conjunction with the appended claims and the drawings attached hereto.

BRIEF DESCRIPTION OF THE DRAWINGS

The drawings, not drawn to scale, include:

FIG. 2 which is an exploded view of the apparatus shown in FIG. 1;

DETAILED DESCRIPTION OF THE PRESENT INVENTION

Figure 1:
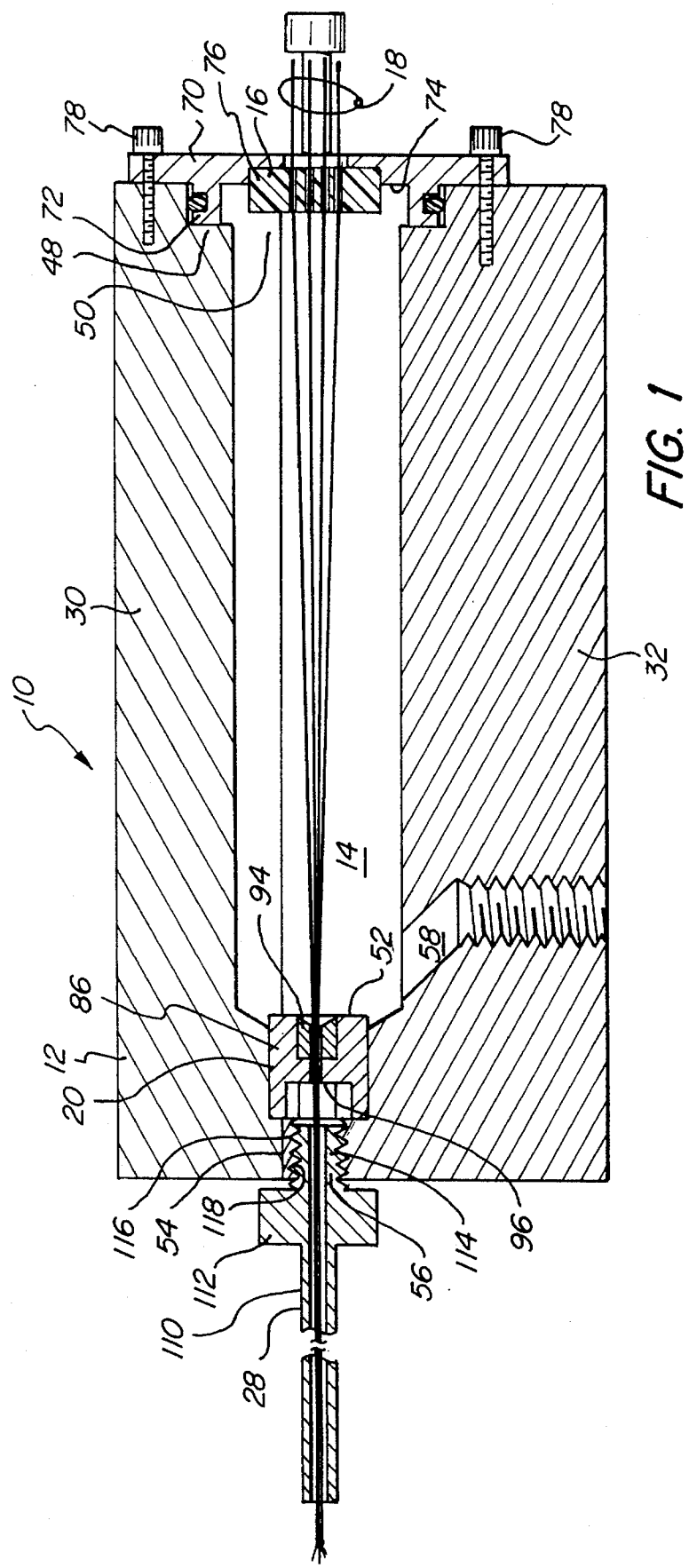
FIG. 1 which is a cross-sectional view of an apparatus for applying gel to a plurality of optical fibers embodying the principles of the present invention.

An apparatus for applying gel to a plurality of optical fibers, generally indicated at 10 in the FIGURES and embodying the principles of the present invention, includes a housing 12 having a cavity 14 therein, means 16 for guiding and separating a plurality of optical fibers 18 into the cavity 14, means 20 for guiding the optical fibers 18 out of the cavity 14, and means 22 for injecting a gel into the cavity 14 such that each optical fiber 18 is coated with the gel.

Preferably, the apparatus 10 also includes means 24 for aligning the apparatus 10 with an extrusion cross head 26 and means 28 for injecting the plurality of optical fibers 18 into the extrusion cross head 26.

In the preferred embodiment, the apparatus 10 includes first and second members, 30 and 32, respectively, cooperatively sized and shaped such that when placed together the cavity 14 is formed. The members, 30 and 32, are secured together along a first major side 34 thereof by a hinge means 36. The members, 30 and 32, are provided with one or more latch means 38 on second major sides 40 thereof which second major sides 40 oppose the first major sides 34. Hence, by being able to be opened, the apparatus 10 provides direct access to the cavity 14 as well as the means 16 for guiding and separating a plurality of optical fibers 18 into the cavity 14 and the means 20 for guiding the optical fibers 18 out of the cavity 14. This direct access thus allows the plurality of optical fibers 18 to be threaded through the apparatus 10 with comparative ease.

In the embodiment shown, the housing 12 includes first and second end walls, 42 and 44, respectively, and sidewalls 46. The housing 12 also includes a recess 48 extending into the first end wall 42 and adapted to interface with the means 16 for separating the plurality of optical fibers 18. The recess 48 terminates at the first end 50 of the cavity 14. The cavity 14, in one embodiment has a generally circular cross-section along the length thereof and can have a comparatively larger cross-section at the first end 50 and a comparatively smaller cross-section at the second end 52 thereof. Preferably, although not necessary, the cavity 14 can be linearly tapered between the first and second ends, 50 and 52, thereof. Further, the second end of the cavity 14 is adapted to interface with the means 20 for guiding the optical fibers 18 out of the cavity 14.

In the preferred embodiment, the housing 12 includes an opening 54 extending into the second end wall 44 thereof. The opening 54 is sized to accept one end 56 of the means 28 for injecting the optical fibers 18 into the extrusion cross head 26. Further, the housing 12 is provided with a passageway 58 for gel to be injected into the cavity 14 by the means 28 for injecting gel. Typically, the passageway 58 is a machined opening extending from a sidewall 46 of the housing 12 and terminating angularly at the cavity 14 within the housing 12. Preferably, the passageway 58 is angled toward the exit end of the cavity 14. Hence, when gel is provided to the cavity 14 under pressure, the pressure and flow of gel does not impact the optical fibers 18 within the cavity 14. That is, is has been found that if the passageway 58 terminates such that the flow of gel is directed toward, for example, perpendicularly to the optical fibers 18, undue tension and bending forces are applied to the optical fibers 18. Thus, by providing the passageway 58 such that it is angled toward the exit end of the cavity 14, such tension and bending forces can be avoided and stress applied to the optical fibers 18 is minimized.

In the such an embodiment, as shown in FIG. 2, the housing 12 also includes through-bores 60 and 62, respectively. The through-bores 60 and 62 are spaced apart on opposite sides of the gel inlet passageway 58 and extend between the first and second end walls, 42 and 44, respectively, of the housing 12. Further, the through-bores 60 and 62 are disposed to receive a pair of alignment rods 64, shown in FIGS. 5 and 6, that are affixed to a stand 66, that holds the apparatus 10. The stand 66, in conjunction with the alignment rods 64 provides the means 24 for aligning the housing 12 with the extrusion cross head 26. The stand 66 thus supports the alignment rods 64 and thus the apparatus 10 such that there is no physical contact with the extrusion cross head 26. Hence, there is no thermal conduction into the housing 12. The height of the stand 66 is adjustable by means 68 as shown in FIG. 6. The means 68 which can be any conventional adjustment means also serves to maintain the apparatus 10 in a level position.

As shown in FIGS. 1 and 2, the means 16 for separating the plurality of optical fibers 18 includes a faceplate 70 having a collar 72 extending from one side 74 thereof. In one preferred embodiment, the faceplate 70 is circular and the collar 72 is sized to extend into the recess 48 in the first end wall 42 of the housing 12. The faceplate 70 is also provided with a removable plastic insert 76 containing a plurality of spaced apart holes through which the plurality of optical fibers 18 enter the cavity 14. The plurality of spaced apart holes of the plastic insert 76 are cooperatively sized with the optical fibers 18 to allow relatively free movement of the optical fibers 18 therethrough but are sufficiently small to prevent massive gel leakage thereacross. The faceplate 70 can be affixed to the housing 12 by known conventional fasteners, such as screws 78. In one embodiment, the screws 78 are inserted into the housing 12 and the faceplate 70 is provided with arced slots 80 having screw clearance openings 82 at the ends 84 thereof. Hence, the faceplate 70 can be interchangeably affixed to the housing 12 by placing the screw clearance openings 82 over the screws 78 and rotating the faceplate 70 into position. Thereafter, the screws 78 can be tightened against the faceplate 70 to secure the faceplate 70 to the housing 12. Preferably, the faceplate 70 is removably affixed to the housing 12 so that different plastic inserts 76 having different numbers and/or different sizes of spaced apart holes can be used with corresponding fibers. The faceplate 70 and the collar 72 thereof are preferably machined to provide a leak proof seal against the first end wall 42 of the housing 12 to prevent leakage of the gel from the cavity 14. Further, depending upon the viscosity of the gel and the pressure maintained within the cavity 14, seals can also be provided between the faceplate 70 and the first end wall 42 of the housing 12.

Figure 4:
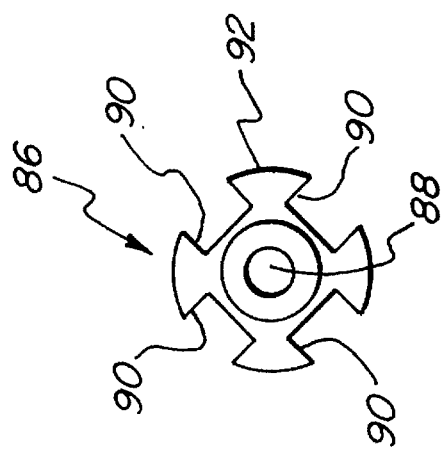
FIG. 4 which is an end view of a spline member particularly useful in conjunction with an apparatus for applying gel to a plurality of optical fibers.
Figure 3:
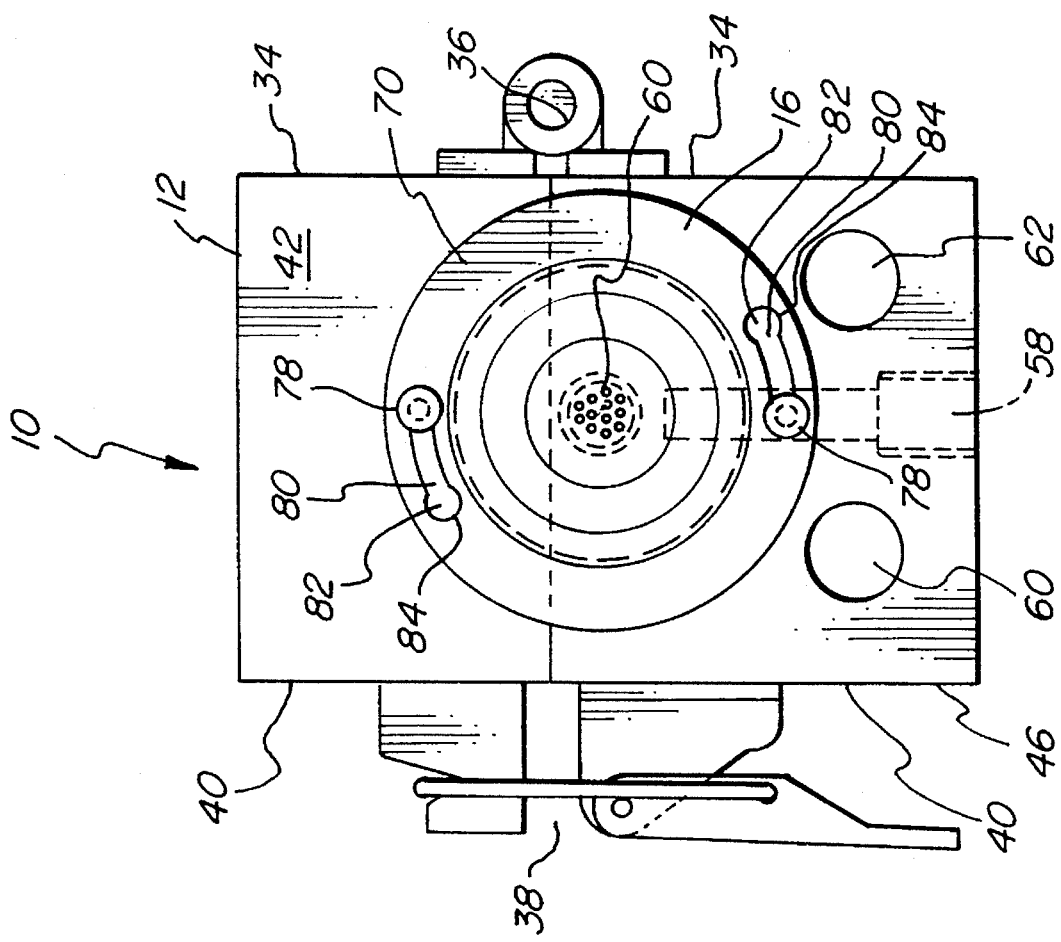
FIG. 3 which is an end view of an apparatus for applying gel to a plurality of optical fibers.

In one embodiment, as shown in FIGS. 1 and 4, the means 20 for guiding the optical fibers 18 out of the cavity 14 includes a spline member 86 having an opening 88 therethrough and a plurality of slots 90 extending into the peripheral edge 92 thereof. The spline member 86 is disposed at the second end 44 of the cavity 14. The opening 88, in the preferred embodiment, is axially disposed and sized to accept the plurality of optical fibers 18. The spline member 86 is preferably removable so that a spline member 86 can be selected in accordance with the number of optical fibers 18 traversing the cavity 14. In the preferred embodiment, the opening 88 of the spline member 86 includes a first section 94 proximate the cavity 14 and a die 96 disposed within the first section 94. The die 96 has a comparatively smaller diameter than the first section 94. Such an arrangement allows for gel to be provided about the close bundle of optical fibers 18 formed by the spline member 86. Further, the diameter of the die 96 is substantially smaller than the needle-like tube 110 of the means 28 for injecting the plurality of optical fibers 18 into the extrusion cross head 26. This arrangement allows gel to pass through the slots 90 so that a layer of gel is established and maintained around the close bundle of optical fibers 18. Hence, the close bundle of optical fibers 18 retains the layer of gel through the means 28. During operation, the layer of gel provides a layer of thermal insulation between the plurality of optical fibers 18 and the needle-like tube 110 as it passes through the extrusion cross head 26. In this manner sticking of the optical fibers 18 is avoided.

Figure 5:
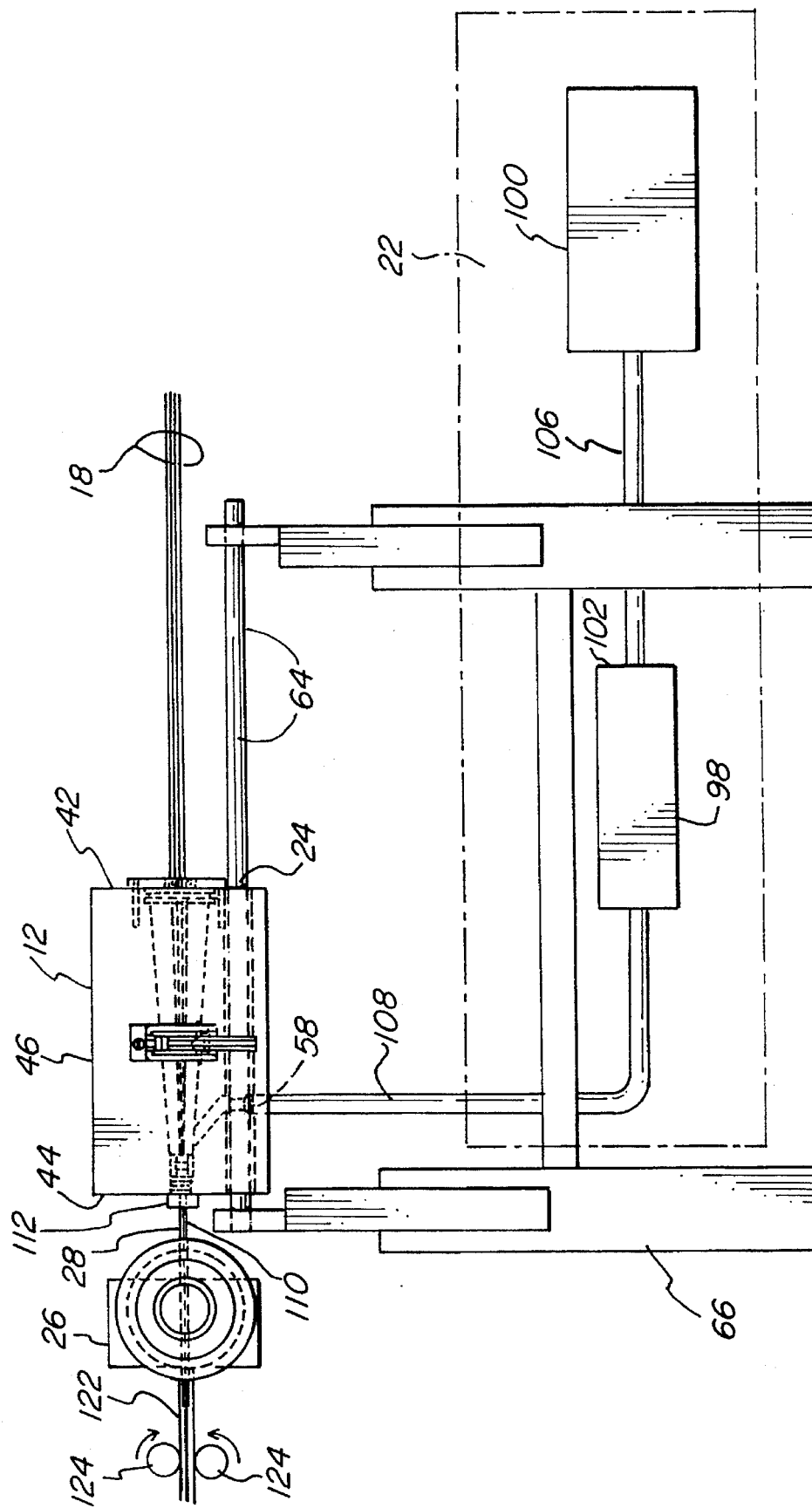
FIG. 5 which is a block diagram of a system for forming a bundle of optical fibers wherein an apparatus embodying the principles of the present invention is particularly useful.
Figure 6:
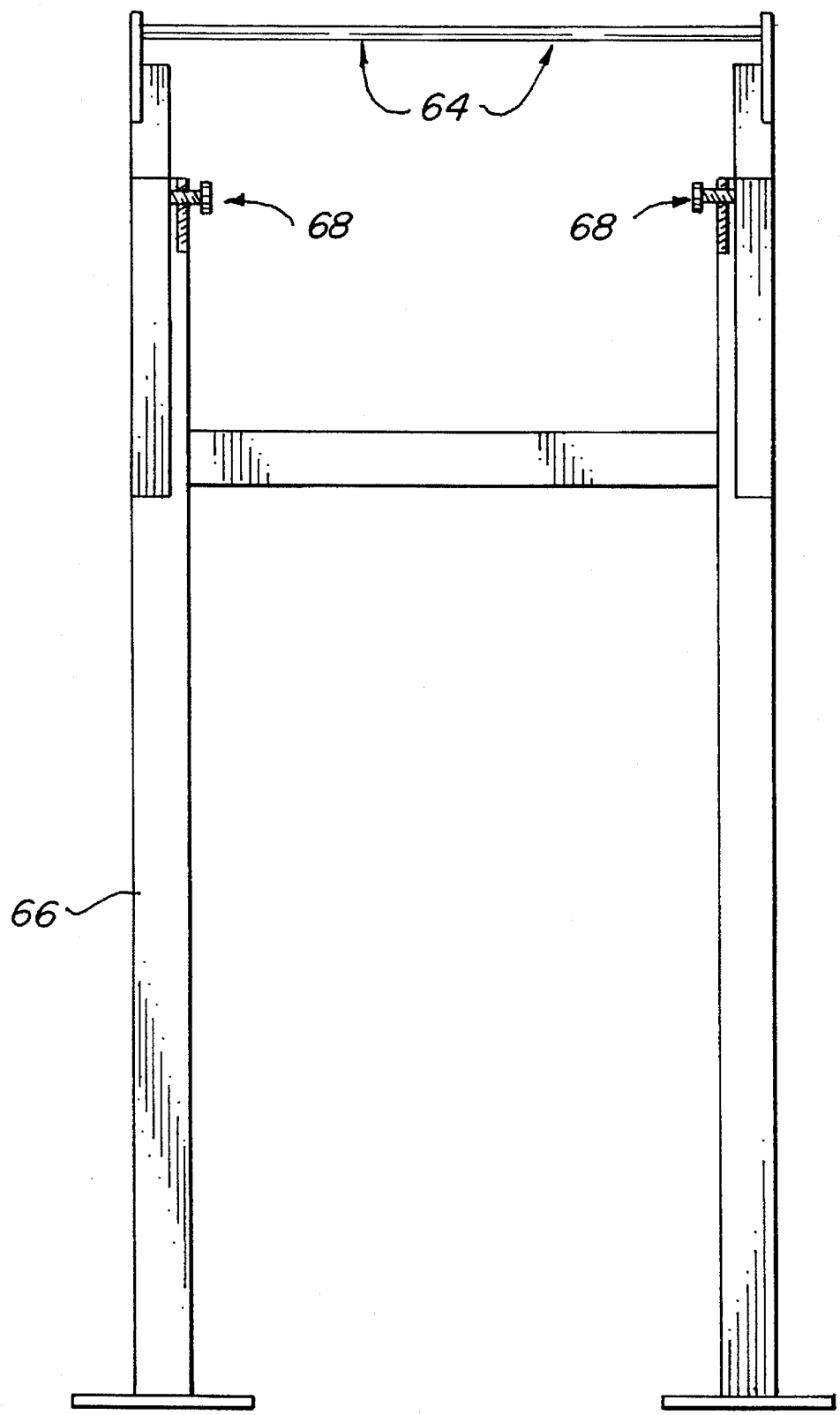
FIG. 6 which is a side view of a stand particularly useful in the system shown in FIG. 5.

As shown in FIG. 5 the means 22 for injecting gel into the cavity 14 includes a metering pump 98 that communicates with a gel reservoir 100 on the inlet side 102 thereof and the passageway 58 in the housing 12 on the outlet side 104 thereof. In one embodiment, the metering pump 98 is connected to the gel reservoir 100 by an inlet conduit 106 and the passageway 58 by an outlet conduit 108. The connections of the conduits, 106 and 108, are sealed and made leak proof by conventional techniques. The metering pump 98 is preferably a gear pump that meters specific amounts of gel into the gel cavity. Typical of such a pump can be a Zenith gear pump rated for about 9 cc/rev. Such a pump is commercially available from the Zenith Pump Division of Parker Hannifin Corp. of Sanford, N.C.

In one embodiment, the means 28 for injecting the plurality of optical fibers 18 into the extrusion cross head 26 includes a needle-like tube 110 affixed at one end 56 thereof to a bushing 112. Preferably, the bushing 112 includes a shaft section 114 having external threads 116 that are cooperatively sized to mate with internal threads 118 formed in the opening 54 of the second end wall 44 of the housing 12. When assembled, the shaft section 114 terminates in the opening 54 proximate the spline member 86. Hence, the plurality of optical fibers 18 pass directly into the tube 110 from the opening 88 of the spline member 86.

A system for bundling a plurality of optical fibers, generally indicated at 120 in FIG. 4, includes the apparatus 10 disposed on the alignment rods 64 such that the needle-like tube 110 extends into the center of the extrusion cross head 26. In operation, the plurality of optical fibers 18 are fed into the cavity 14 via the faceplate 70 and out of the cavity via the die 96 in the spline member 86. From the spline member 86, the plurality of optical fibers 18 are fed into the needle-like tube 110 with a layer of gel about not only each of the optical fibers 18 but between the close bundle of optical fibers 18 and the needle-like tube 110. Thereafter, the apparatus 10 is moved along the alignment rods 64 until the needle-like tube 110 extends into the extrusion cross head 26. The plurality of optical fibers 18, thermally protected by the gel, then pass into an extrusion tube 122 which is disposed, in one embodiment, between opposing drive belts 124 that pull, or draw, the tube 122 and the plurality of optical fibers 18 therein through the extrusion cross head 26. As the tube 122 exits the extrusion cross head 26 the tube 122 draws down about the plurality of optical fibers 18 to form a close bundle of optical fibers that are subsequently used to form an optical fiber cable. During the drawing process the cavity 14 of the apparatus 10 is provided with a gel from the gel reservoir 100 via the metering pump 98. The gel is provided under a preselected pressure and the amount of gel in the cavity 14 is maintained to ensure that no air gaps are formed about the separated optical fibers 18.

In one particular embodiment, the apparatus 10 as well as the various parts thereof can be machined from any material that is chemically inert to the gel material used. Hence, the apparatus 10 can be made relatively inexpensively while sufficient accuracy and tolerances are maintained. Further, the apparatus 10 has been found to function with gels having a wide range of viscosity, for example, gels having viscosities between 230,000 centipoise and 580,000 centipoise. Such materials, when used in conjunction with the apparatus 10 have been found to not only avoid air gaps within the cavity 14 but also to create a mechanical barrier that eliminates fiber sticking. Further, it has been found that with such an arrangement, fiber tensions were within acceptable limits for the bundling operation. In addition, the fiber bending stresses induced during the bundling operation were quite acceptable. Typically, the insert fiber tension was on order of between 50–60 grams and the exit fiber tension was on the order of between 55–70 grams. The fiber bending stress was on the order of about 2 millibar.

Hence, from the above description it will be understood that the apparatus 10 provides numerous advantages during the formation of optical fiber bundles. For example, the bundles have a significantly reduced number of air gaps therein. The plurality of optical fibers leaving the cavity 14 are very accurately aligned with the extrusion cross head 26 thereby eliminating problems caused by the optical fibers rubbing on the extrusion cross head tooling 26. Still further, it has been found that the extruded tube resulting from use of the apparatus 10 has a more consistent diameter thus making the optical fiber cables more consistent.

Although the present invention has been described with respect to a specific embodiment it will be understood that other configurations and arrangements can also be made that do not depart from the spirit and scope of the description set forth herein. Hence, the present invention is deemed limited only by the appended claims and the reasonable interpretation thereon.

What is claimed is:

1. An apparatus for applying gel to a plurality of optical fibers, comprising:

a housing, said housing having a cavity therein, said cavity having a first end terminating proximate a first end wall of said housing and a second end terminating within said housing, said housing includes first and second members cooperatively sized and shaped such that when placed together the cavity is formed, said members being secured together along a first side thereof by a hinge means and being provided with one or more latch means on a second side thereof;

means, disposed at said first end of said cavity, for separating a plurality of optical fibers entering into said cavity, said means for separating said optical fibers including a faceplate having a plastic insert associated therewith, said plastic insert having a plurality of spaced apart holes therethrough, each of said spaced apart holes being cooperatively sized to allow one of said optical fibers to pass therethrough;

means, disposed at said second end of said cavity, for guiding said optical fibers out of said cavity; and injecting means, in fluid communication with said housing, for injecting a gel into said cavity such that each said optical fiber is coated with said gel.

2. The apparatus as claimed in claim 1 wherein said faceplate includes a collar, said collar being cooperatively sized to extend into a recess in said first end wall of said housing, said recess terminating at said first end of said cavity.

3. The apparatus as claimed in claim 1 further including adjustable fastening means mounted on said housing for removably affixing said faceplate to said housing.

4. The apparatus as claimed in claim 1 wherein said means for guiding said optical fibers out of said cavity includes a spline member having an opening therethrough, said spline member being disposed at said second end of said cavity, said opening in said spline member being sized to accept said plurality of optical fibers such that a bundle is formed.

5. The apparatus as claimed in claim 4 wherein said spline member further includes a plurality of slots extending into the peripheral edge thereof.

6. The apparatus as claimed in claim 4 wherein said opening of said spline member is axially disposed in said spline member.

7. The apparatus as claimed in claim 4 wherein said opening of said spline member includes a first section proximate said cavity and a die disposed within said first section.

8. The apparatus as claimed in claim 4 wherein said spline member further includes:
- a plurality of slots extending into the peripheral edge thereof, said opening of said spline member being axially disposed in said spline member; and
- a first section proximate said cavity and a die disposed within said first section, said first section having a comparatively larger diameter than said die.

9. The apparatus as claimed in claim 1 wherein said housing includes a passageway extending from a side wall thereof to said cavity; and
- wherein said injecting means includes a gel pump, said gel pump communicating with a gel reservoir on the outlet side thereof and said passageway on the outlet side thereof, said passageway being angularly disposed within said housing and terminating proximate said means for guiding said optical fibers out of said cavity.

10. The apparatus as claimed in claim 9 further includes a pump inlet conduit extending from said reservoir to said inlet side of said pump and an outlet conduit extending from said outlet side of said pump to said passageway in said housing.

11. An apparatus for applying gel to a plurality of optical fibers, comprising:
- a housing, said housing having a cavity therein, said cavity having a first end terminating proximate a first end wall of said housing and a second end terminating within said housing, said housing includes first and second members cooperatively sized and shaped such that when placed together the cavity is formed, said members being secured together along a first side thereof by a hinge means and being provided with one or more latch means on a second side thereof;
- means, disposed at said first end of said cavity, for separating a plurality of optical fibers entering into said cavity;
- means, disposed at said second end of said cavity, for guiding said optical fibers out of said cavity;
- injecting means, in fluid communications with said housing, for injecting a gel into said cavity such that each said optical fiber is coated with said gel; and
- alignment means formed in said housing for aligning said housing with an extrusion cross head, said alignment means including:
  - through-bores formed in said housing between said first end wall and a second end wall opposite said first end wall;
  - alignment rods, said alignment rods received in said through-bores and extending through said housing; and
  - a stand, said alignment rods being affixed to said stand to support said apparatus on said alignment rods proximate said extrusion cross head such that said alignment rods are free of contact with said extrusion cross head.

12. The apparatus as claimed in claim 11 wherein said stand includes means for adjusting the height of said stand.

* * * * *